S. H. GARST.
FRONT TRUCK FOR MANURE SPREADERS.
APPLICATION FILED JULY 24, 1914.
1,127,429.
Patented Feb. 9, 1915.
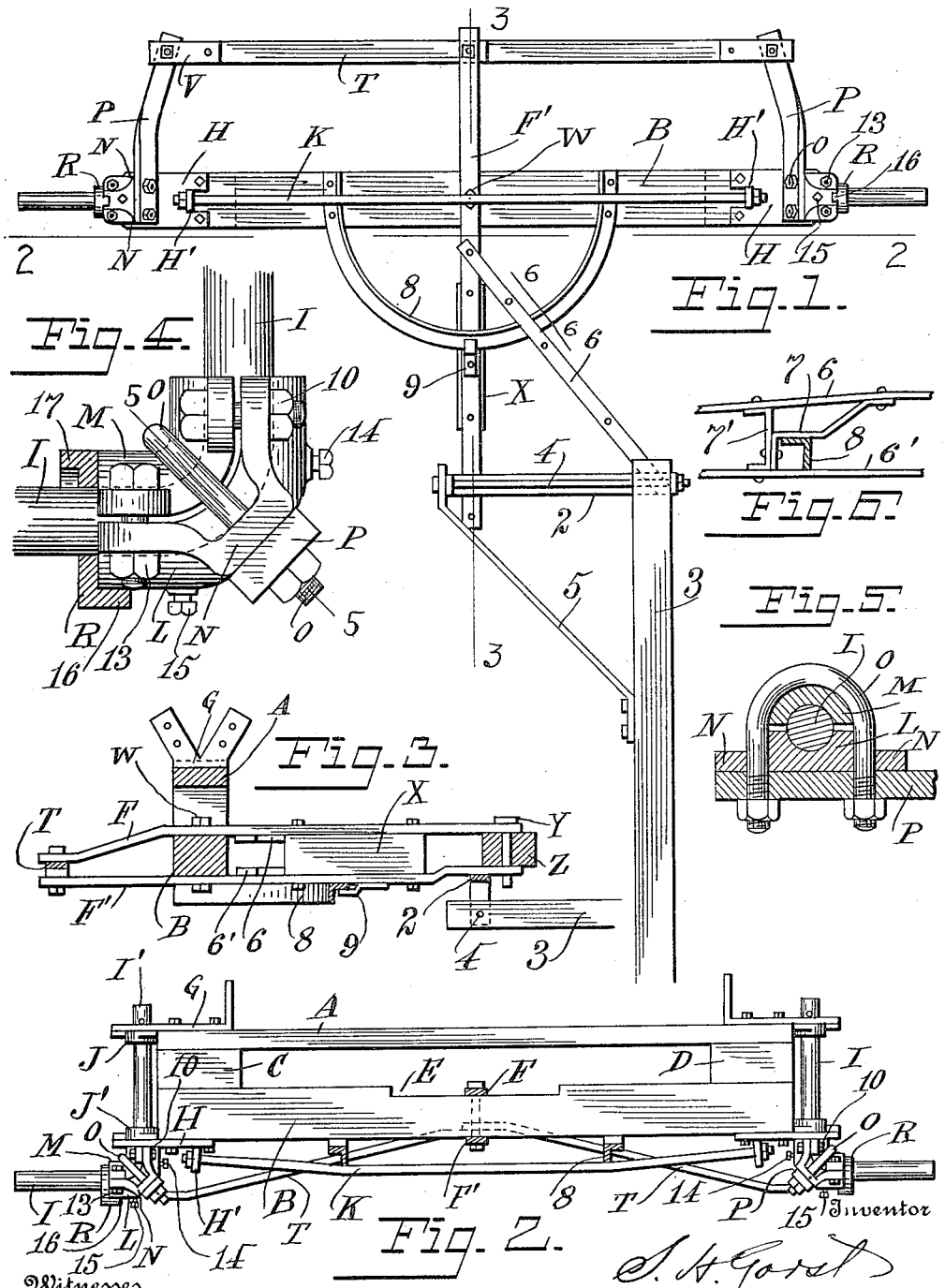

UNITED STATES PATENT OFFICE.

STEPHEN H. GARST, OF MOLINE, ILLINOIS.

FRONT TRUCK FOR MANURE-SPREADERS.

1,127,429.

Specification of Letters Patent.

Patented Feb. 9, 1915.

Application filed July 24, 1914. Serial No. 852,927.

*To all whom it may concern:*

Be it known that I, STEPHEN H. GARST, a citizen of the United States, residing at Moline, in the county of Rock Island and State of Illinois, have invented certain new and useful Improvements in Front Trucks for Manure-Spreaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in front trucks of manure spreaders and the like.

The invention consists of a bolster with pivoted axles and their connecting parts.

The object of the invention is to provide a front truck for a manure spreader with a low box or body. The body of a low down spreader is so near the ground that the front wheels will not turn under the body, therefore, it is impossible to make short turns with the usual construction which consists of a swivel front axle. The usual practice is to set the front axle far enough ahead of the spreader body so as to allow said front axle to turn without the wheels coming in contact with the spreader body. The objection to placing the front truck ahead of the body is due to the fact that it makes a long machine with a long wheel base which is inconvenient to get around with in barns or barnyards; and, furthermore, the spreader body with the supports so far apart requires stronger and more costly construction.

Broadly speaking, pivoted axle construction is not new, but what I consider new and to be involved in my present improvements is the strong, simple and practical construction herein illustrated and described, whereby the disadvantages and undesirable features above briefly mentioned are obviated.

In the accompanying drawings which illustrate the essential features of my improvements, Figure 1 is a bottom plan view of the front truck; Fig. 2 is a sectional elevation on the line 2—2 of Fig. 1; Fig. 3 is a sectional elevation on the line 3—3 of Fig. 1; Fig. 4 is a detail view of the clamping members of the axles; and Fig. 5 is a section on the line 5—5 of Fig. 4; Fig. 6 is a section on the line 6—6 of Fig. 1.

In a detail description of my improvements or invention, similar reference characters indicate corresponding parts both in the drawing and in the description.

The truck consists of a bolster constructed of two members A and B which may be either wood or metal. These two bolster members are separated at their ends by space blocks C and D which are securely bolted to the member B and serve to strengthen the same. The space between said bolster members forms a passageway for the lower run of the movable bottom of the spreader (not shown) and also strengthens the bolster by forming a truss. The intervening space E forms a recess for the pivot bar F to move in without coming in contact with the movable bottom of the spreader. Both ends of the bolster are provided with upper and lower plate brackets G and H. The brackets G are split and are turned up at right angles at their inner ends to provide for securing the sills of the spreader body thereto. The outer ends of said brackets G are reinforced by a collar or boss J riveted to the under side thereof. These collars or bosses are provided each with a square flange or rib which abuts against the end of the top bolster member A. The vertical parts I' of the axles I are received by the brackets G and collars or bosses J, and the abutting flanges of said brackets receive the inward thrust of the vertical parts of said axles and thus relieve and protect the bolts which secure said brackets, from this thrust. The collars or bosses J also serve to increase the bearings in the brackets for said axles thereby preventing the vertical parts of said axles from cutting under heavy loads and causes them to pivot with less friction.

The lower brackets H are bolted to the lower side of the lower bolster member B and form supports for the vertical parts of the axles I and also form bearings which support the ends of the bolster on said axles. At the inner ends of said brackets H apertured tongues H' are formed which extend at right angles to the face of the brackets or nearly so. These tongues H' receive the ends of a truss rod K which is secured thereto by means of lock-nuts. On the said brackets H, where the vertical parts I' of the axles pass through the brackets, collars or bosses J' are riveted to the upper sides of said brackets. These collars J' are similar to the collars J of the upper brackets and are for the same purpose, the vertical parts I' of the axles passing therethrough. At the bend of each axle I, the axle is clamped by two angular castings, an outside casting L and an inside casting M. The outside casting L is provided with two ears N to which is secured a rearwardly projecting arm P. The two clamping members L and M are clamped securely to the angle of the axle by means of a U-bolt O which straddles the member M and passes through the ears N of the member L and also through the arm P and is secured by lock-nuts. Set-screws 14 and 15 are also instrumental in clamping the members L and M to the axle. The members or castings L and M are formed with wide flanges at their top sides which form supports and bearings for the bolster bracket H which in turn supports one corner of the box or body. At the outer end of each clamp so consisting of the castings L and M, is a loose collar R on the axle I provided with a suitable flange which fits over the ends of said castings and prevents the collar from turning. This loose collar R has a projection 16 which fits between the bolts 13 to prevent its turning on the axle. The front face of said collar is provided with a flange 17 which is instrumental in preventing dirt working into the joint between the collar and the end of the wheel (not shown). This collar takes all the wear caused by the turning of the wheel and can be readily replaced when worn out. The bars T connect the two rearward arms P. The outer ends of said bars T have riveted to them offset clips V which form openings which receive the ends of said arms P, said parts being connected by bolts of large diameter provided with lock-nuts. This connection forms a strong and durable joint in which the lost motion can be taken up and held in a permanent position by means of said lock-nuts. The bars T form a joint at their inner ends with the swivel bars F and F', the top bar F being offset sufficiently at the rear end to make a snug joint of the four pieces. This joint is also secured by means of a bolt and lock-nut and can be kept in perfect adjustment and not be permitted to work loose. The swivel bars F and F' are pivoted to the bolster member B at W. The space between the forward ends of these bars F and F' is adapted to receive a double-tree Z of the hitch which is held in position by means of a draw-bolt Y passing through openings in the bars F and F'. Between the bars F and F' near the front is secured a spacing block X which stiffens said bars and holds them in place. To the lower side of the front end of the bar F' is secured a crossbar 2 extending at right angles to the bar F'. This bar 2 has its ends bent down to receive the base of the pole 3 which is secured to the bar 2 by a rod 4 and brace 5. The outer end of the bar 2 is offset to receive the end of a double brace 6 which extends forward to the outer end of the bar 2. A circle iron 8, preferably made of angle steel, is bolted to the bolster member B and is further supported by the truss rod K which, as before stated, is secured at its ends to the tongues H' of the plate brackets H. Thus the bolster member B is greatly reinforced and the truss rod is free from engagement with any wood part. Riveted to the under side of the bar F' in front of the circle iron 8 is an offset clip 9 which engages the under side of the horizontal flange of the circle bar 8. This prevents the draw-bar, consisting of bars F and F' from rising and the bracket 7 resting on the top of the circle iron 8 prevents the draw-bar bending down when the machine is backed by the horses. The bracket 7 is riveted to the lower side of the brace 6 and to a distance piece 7' which is riveted to the brace 6 and to a lower bar 6' which, together with the brace 6, forms the double brace secured to the bars F and F'.

As shown in Fig. 1, the pole 3 is placed off the center for a three horse hitch in which case an equalizer is used instead of the double tree Z. In placing the pole in this position, the rod 4, which acts as a pivot, is withdrawn and the pole turned over to such position and the said rod replaced. In the case of the two horse hitch, it will be understood the pole 3 is in alinement with the draw-bar consisting, as before stated, of the bars F and F'.

Having described my invention, I claim—

1. In a front truck, the combination of an angular axle, bearings in which the upright portion of said axle is adapted to oscillate, a clamp consisting of two castings which inclose the angle of the axle, the upper portion of said clamp and the upright portion of the axle forming a pivot for said axle, bolts penetrating the flanges of said clamp, and a U-bolt straddling one member of said clamp and penetrating apertures in the other member thereof, said U-bolt lying within the angle formed by the clamp and the axle.

2. In a front truck, the combination of an angular axle, upper and lower plate brackets forming a bearing for the upright portion of said axle, an angular clamp consisting of two members inclosing the angle of the axle, bolts uniting said clamping members at their ends, the outermost one of said clamping members having apertured ears projecting from the angle thereof, a U-bolt straddling said clamping members at the angle and penetrating said apertured ears, and an arm attached to said outermost clamping member by said U-bolt.

3. In a front truck, the combination of a bolster, of upper and lower plate brackets secured thereto, a truss rod connected to the lowermost ones of said brackets, angular axles the upright parts of which are journaled in said plate brackets, clamps embracing the angles of said axles, said clamps consisting each of an angular casting on the inside of the angle and an angular casting on the outside of the angle, arms engaging said outside castings, and U-bolts straddling said clamp castings at the angles and securing the arms thereto.

4. In a truck, the combination with a bolster, of upper and lower brackets attached thereto, angular axles the upright portions of which are journaled in said brackets, thrust collars on the upright portions of said axles engaging the ends of the bolster, clamps secured to said axles at the angles thereof, each of said clamps consisting of inner and outer angular castings, the outer casting having apertured ears, a U-bolt straddling said inner and outer clamp castings within the angle and penetrating said apertured ears, arms secured to said outer clamp castings between said apertured ears and secured thereto by said U-bolts.

5. In a front truck, the combination with a bolster, of an angular axle, brackets secured thereto and forming bearings for the upright portion of said axle, a clamp consisting of inner and outer members inclosing said axle at the angle thereof, bolts uniting said clamping members on each side of the angle, a U-bolt straddling said clamping members at the angle, and an arm united to the outer member in a plane with the angle of the clamp and secured thereto by said bolt.

In testimony whereof I affix my signature, in presence of two witnesses.

STEPHEN H. GARST.

Witnesses:
SHEMAN C. HARTSOCK,
HUBERT BURGIS.

Copies of this patent may be obtained for five cents each, by addressing the "Commissioner of Patents, Washington, D. C."